(No Model.)

F. W. LAMOREUX.
BUCKBOARD WAGON.

No. 359,791. Patented Mar. 22, 1887.

Witnesses.
A. Ruppert,
Jno. M. Henderson,

Inventor.
Fred W. Lamoreux
by Franklin H. Hough
Attorney

UNITED STATES PATENT OFFICE.

FRED W. LAMOREUX, OF LIBERTY, NEW YORK.

BUCKBOARD-WAGON.

SPECIFICATION forming part of Letters Patent No. 359,791, dated March 22, 1887.

Application filed September 10, 1886. Serial No. 213,223. (No model.)

*To all whom it may concern:*

Be it known that I, FRED W. LAMOREUX, a citizen of the United States, residing at Liberty, in the county of Sullivan and State of New York, have invented certain new and useful Improvements in Buckboards; and I do hereby declare the following to be a full, clear, and exact description of the invention, such as will enable others skilled in the art to which it appertains to make and use the same, reference being had to the accompanying drawings and letters of reference marked thereon, which form a part of this specification.

Figure 1:
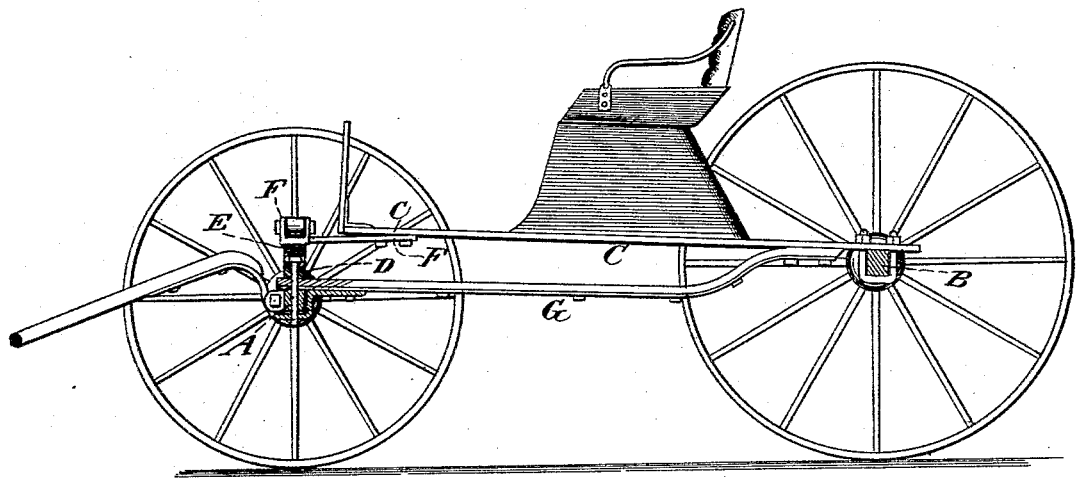
Figure 2:
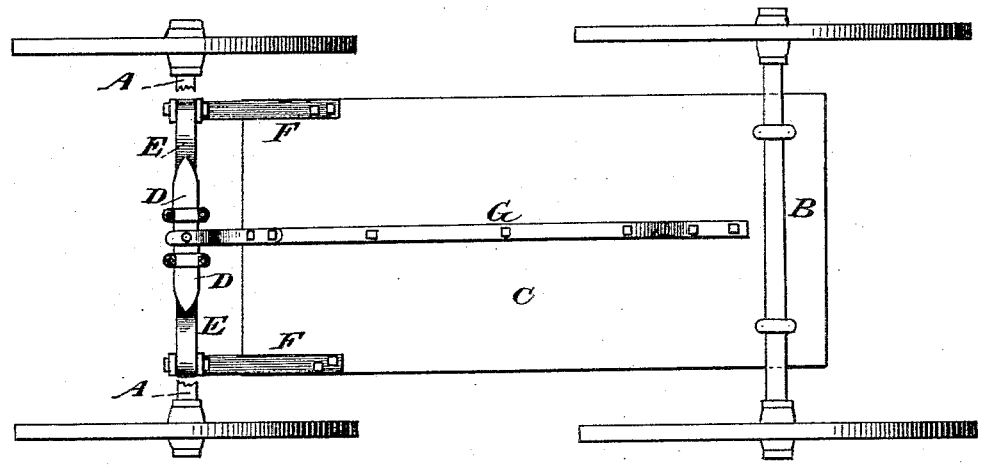

In the accompanying drawings, Figure 1 is a side elevation of my invention. Fig. 2 is a bottom plan showing the arrangement of the spring and reach.

This invention relates to that class of vehicles known as "buckboards;" and the novelty consists in the peculiar combinations and the novel construction, arrangement, and adaptation of parts, all as more fully hereinafter described, shown in the drawings, and then specifically defined by the claims.

Referring to the drawings by letter, A designates the front, and B the rear, axle. The platform C is rigidly secured at one end to the rear axle in any well-known way.

D is a head-block, secured to the front axle by any approved means.

E is a semi-elliptic spring, preferably secured to said head-block, as shown, and F F are connections secured at one end to the forward end of the platform, and at their other end pivotally connected to the ends of the spring E, in advance of the forward end of the platform, in any suitable manner, preferably by shackles.

G is a reach, pivotally connected with the front axle, near the center thereof, and extending under the platform, along the longitudinal center thereof, and its rear end secured to the under side of the platform, back of the seat and independent of the rear axle. The rear end of the reach is curved upwardly, as shown, and the forward end of the platform is slightly to the rear of the spring E. By this construction and arrangement I provide for the springing of the platform, (which of course is of spring material,) which, combined with the elasticity of the spring and connections, produces a very easy-riding vehicle; and the general construction and arrangement of the spring, platform, and reach removes the jar from the seat, and prevents the disagreeable rumbling sound common with buckboards heretofore constructed.

It will be observed that I employ but one spring. The construction is simple, and the device as a whole is durable and cheap of construction.

I attach great importance to the manner in which the forward end of the platform is secured to the spring upon the forward axle. The end of the platform being some distance in the rear of the axle, instead of being directly over it, as has heretofore been common, a free downward movement of the platform is allowed, and the annoyance occasioned by sudden jolts when driving over rough or uneven roads is in a very great measure avoided.

Having thus described my invention, what I claim as new, and desire to secure by Letters Patent, is—

1. In a buckboard, a platform rigidly connected at its rear end with the rear axle, combined with a single spring on the front axle, flexible connections between said spring and the front end of the platform, and a reach connecting the front axle with the rear of the platform, as set forth.

2. The combination, with the axles and end platform rigidly secured to the rear axle and yieldingly connected with a transverse semi-elliptical spring on the front axle, of a reach pivotally connected to the front axle, arranged in the longitudinal center of the platform, to the rear end of which it is secured independent of the rear axle, substantially as described.

In testimony whereof I affix my signature in presence of two witnesses.

FRED W. LAMOREUX.

Witnesses:
GEO. H. CARPENTER,
LUTHER WEBSTER.